(12) United States Patent
Ou et al.

(10) Patent No.: US 11,855,761 B2
(45) Date of Patent: Dec. 26, 2023

(54) SIGNALING-TYPE MANAGEMENT AND CONTROL METHOD FOR MOBILE PHONE SIGNAL

(71) Applicant: ZHEJIANG SUNWAVE COMMUNICATIONS TECHNOLOGY CO., LTD., Hangzhou (CN)

(72) Inventors: Xingbao Ou, Hangzhou (CN); Yongfu Cao, Hangzhou (CN); Jianfeng Yang, Hangzhou (CN); Yongchao Yuan, Hangzhou (CN)

(73) Assignee: ZHEJIANG SUNWAVE COMMUNICATIONS TECHNOLOGY CO., LTD., Hangzhou (CN)

( * ) Notice: Subject to any disclaimer, the term of this patent is extended or adjusted under 35 U.S.C. 154(b) by 420 days.

(21) Appl. No.: 17/274,172

(22) PCT Filed: Mar. 29, 2019

(86) PCT No.: PCT/CN2019/080322
§ 371 (c)(1),
(2) Date: Mar. 6, 2021

(87) PCT Pub. No.: WO2020/077955
PCT Pub. Date: Apr. 23, 2020

(65) Prior Publication Data
US 2021/0203432 A1 Jul. 1, 2021

(30) Foreign Application Priority Data
Oct. 19, 2018 (CN) .......................... 201811226172.5

(51) Int. Cl.
H04K 3/00 (2006.01)
H04L 5/00 (2006.01)
(Continued)

(52) U.S. Cl.
CPC ................. *H04K 3/68* (2013.01); *H04K 3/45* (2013.01); *H04L 5/0048* (2013.01); *H04L 5/14* (2013.01);
(Continued)

(58) Field of Classification Search
CPC .. H04K 3/68; H04K 3/45; H04K 3/42; H04K 2203/16; H04K 3/46; H04K 3/62;
(Continued)

(56) References Cited

U.S. PATENT DOCUMENTS 6,111,910 A * 8/2000 Cui ...................... H04B 7/0854
375/150
8,260,190 B2 9/2012 Johnson et al.
(Continued)

FOREIGN PATENT DOCUMENTS

CN 102868421 A 1/2013
CN 105357751 A 2/2016
(Continued)

OTHER PUBLICATIONS

ISR of PCT/CN2019/080322.
First Office Action of CN 201811226172.5.
Second Office Action of CN 201811226172.5.

*Primary Examiner* — Stephen M D Agosta

(57) ABSTRACT

A signaling-type method for mobile phone signals, comprising: establishing a shielding processing system, and ensuring that the frequency reference of said system is synchronized with that of a base station; using the feature that a frame signal of a base station is repeatedly transmitted according to a frame period of the base station, receiving the frame signal of the base station at different times; performing filtering processing on the frame signals of the base station using a frame averaging method, so as to obtain purified frame reference signals of the base station; and
(Continued)

---

Establishing a shielding processing system, which is ensured that the frequency reference of the system is synchronized with that of a base station

↓

Successively receiving frame signals of the base station multiple times

↓

Performing filtering processing on the received frame signals of the base station by multi-frame mean to select a frame reference signal of the base station

↓

Using the selected frame reference signal to shield the base station using the purified frame reference signals to shield the base station.

1 Claim, 3 Drawing Sheets

(51) Int. Cl.
   *H04L 5/14* (2006.01)
   *H04L 43/028* (2022.01)
   *H04W 56/00* (2009.01)
(52) U.S. Cl.
   CPC ......... *H04L 43/028* (2013.01); *H04W 56/001* (2013.01)
(58) Field of Classification Search
   CPC ....... H04L 5/0048; H04L 5/14; H04L 43/028; H04W 56/001; H04W 56/0035
   See application file for complete search history.

(56) References Cited

U.S. PATENT DOCUMENTS

| | | | |
|---|---|---|---|
| 8,543,053 | B1 | 9/2013 | Melamed et al. |
| 9,356,727 | B2* | 5/2016 | Immendorf ............ H04K 3/40 |
| 9,584,350 | B1* | 2/2017 | Maiuzzo ............... H04K 3/92 |
| 9,787,424 | B2* | 10/2017 | Filson ................ H04W 24/00 |
| 10,623,131 | B2* | 4/2020 | Breuer ................ H04K 3/226 |
| 11,304,055 | B2* | 4/2022 | Mildh ................. H04W 76/19 |
| 2004/0242149 | A1* | 12/2004 | Luneau ............... H04W 16/10 |
| | | | 455/1 |
| 2010/0240315 | A1* | 9/2010 | Tufvesson ............. H04K 3/43 |
| | | | 455/67.11 |
| 2011/0093180 | A1* | 4/2011 | Hougo .................. B60R 25/04 |
| | | | 701/101 |
| 2011/0223851 | A1* | 9/2011 | Stoddard ............... H04K 3/44 |
| | | | 455/1 |
| 2012/0120893 | A1* | 5/2012 | Baligh ................ H04W 24/02 |
| | | | 370/329 |
| 2012/0324270 | A1* | 12/2012 | Magee .................. H03L 7/099 |
| | | | 713/400 |
| 2014/0018070 | A1* | 1/2014 | Ji ....................... H04W 48/16 |
| | | | 455/434 |
| 2014/0204766 | A1* | 7/2014 | Immendorf ........... H04W 24/04 |
| | | | 370/242 |
| 2014/0206279 | A1* | 7/2014 | Immendorf ............ H04K 3/40 |
| | | | 455/1 |
| 2014/0206343 | A1* | 7/2014 | Immendorf ........... H04K 3/226 |
| | | | 455/423 |
| 2014/0301216 | A1* | 10/2014 | Immendorf ....... H04W 72/1268 |
| | | | 370/252 |
| 2015/0139422 | A1* | 5/2015 | Jover .................. H04L 9/0819 |
| | | | 380/270 |
| 2015/0141026 | A1* | 5/2015 | Jover .................. H04W 16/28 |
| | | | 455/452.1 |
| 2015/0270922 | A1* | 9/2015 | Breuer .................. H04K 3/43 |
| | | | 455/423 |
| 2017/0366294 | A1* | 12/2017 | Breuer ................. H04W 24/02 |
| 2020/0029337 | A1* | 1/2020 | Leizerovich ....... H04B 7/18504 |

FOREIGN PATENT DOCUMENTS

| | | |
|---|---|---|
| CN | 106921993 A | 7/2017 |
| CN | 107359957 A | 11/2017 |
| CN | 109361487 A | 2/2019 |

* cited by examiner

SIGNALING-TYPE MANAGEMENT AND CONTROL METHOD FOR MOBILE PHONE SIGNAL

CROSS REFERENCE TO RELATED APPLICATIONS

This application is a 371 of international PCT patent application PCT/CN2019/080322 filed on Mar. 29, 2019, which claims all benefits accruing from China Patent Application No. 201811226172.5, filed on Oct. 19, 2018, in the China National Intellectual Property Administration, the content of which is hereby incorporated by reference.

TECHNICAL FIELD

The present disclosure generally relates to the technical field of storage and forwarding, and mobile signal control for mobile communication, and in particular, to a signaling-type management and control method for mobile phone signals.

BACKGROUND

Due to multi-user characteristics and multi-base station partition service technical system of current mobile communication system, a frame signal of a base station received from the air contains a large amount of modulated signals of user data, wherein modulated signals of user data account for more than 70% of a transmitting power of the base station, and the rest is mainly frame reference signal.

Generally base stations work with frame reference signals. For example, pilot signals of CDMA series and WCDMA series are their frame reference signals; the frame reference signals of LTE are PSS signals, SSS signals and CRS signals, etc.; the frame reference signals of TD-SCDMA are DWTPS signals and training sequence Midambie signals, etc.; and training sequences of GSM are its frame reference signals. All these frame reference signals of base stations are sent repeatedly according to a frame period of the base stations.

By taking advantage of a feature that the frame signal of the base station is repeatedly sent according to the frame period of the base station, "A system and method of using store-and-forward to achieve cell phone signal shielding," with a publication number CN103607254B discloses a method of extracting a frame signal of a base station, which uses a local antenna to receive and store one frame (or N frames) of downlink air signals, then repeats transmissions of this frame (or N frames) for a period of time and re-receives and stores it, and then retransmits it periodically, which can be seen in the schematic diagram shown in FIG. 1. Because it is a simple forwarding of the received base station signals, which also contains the signal of the user data, and the modulated signals of the user data consume most of the power of the frame signal emitted by the base station, resulting in most of the power of a forwarded RF signal (generally 70-80%) being occupied by the user data part when the base station is busy, thus making an efficiency of shielding reduced. Therefore, a problem of how to improve the efficiency of shielding needs to be solved.

SUMMARY

The purpose of the present disclosure is to overcome the shortcomings of the prior art and provide a signaling-type management and control method for mobile phone signals, using the frame reference signal of a base station to shield transmitting signal of the base station to improve an efficiency of a shielding device.

The purpose of the present disclosure is achieved by the following technical solutions.

A signaling-type management and control method for mobile phone signals, including: establishing a shielding processing system, wherein a frequency reference of the shielding processing system is synchronized with that of a base station, receiving frame signals of the base station in time division, filtering the frame signals of the base station by multi-frame mean to select a frame reference signal of the base station, and shielding a transmitting signal of the base station by the selected frame reference signal to achieve management and control for the mobile phone signals.

According to the present disclosure, the frame signals of the base station is repeatedly sent according to the frame period of the base station, therefore, the frame signals of the base station are received in time division and the frame signals of the base station are filtered by multi-frame mean. Since user data is changing over time, i.e., the signal of data has time-varying characteristics, most of the modulated signals of the user data contained in the frame signals are removed by filtering with vector sum due to the time-varying characteristics, i.e., the modulated signals of the user data, which consume most of the RF transmitting power, are removed from the frame signals, while the reference signal from the base station to the mobile phone is enhanced because it is always present and in constant phase. Then the filtered frame reference signal of the base station is transmitted synchronously to disrupt the base station signals. Because the transmitted frame reference signal of the base station and the original downlink frame reference signal of the base station have the same properties, either of them is the downlink frame reference signal of the base station for the mobile phone. However, the mobile phone cannot distinguish whether the frame reference signal is transmitted by the base station or by the shielding device, and when the undistinguishing is large enough, it may cause failure of decoding and disconnection of the mobile phones with network. Based on the method of the present disclosure, during transmission the RF power occupied by the modulation signal portion of the user data, which accounts for a large percentage of the frame signals of present base stations, can be effectively avoided, thereby effectively improving the shielding efficiency of the shielding device. The technology is effective for various mobile communications, so it has good universality. The above-mentioned shielding processing system is a conventional system, and the specific structure of the system will not be described in detail.

The present disclosure can be further defined and refined by the following technical solutions.

As a technical solution, a sliding mean filtering algorithm is employed in the multi-frame mean of filtering process. A data buffer is created first, and N sets of sample data sets are stored in order in the data buffer, then the earliest set of data is discarded when each new set of data is collected, and then an arithmetic mean or a weighted mean of the N sets of data including the new sets of data is calculated. Specifically, it is assumed that each set of data is composed of M sub-data, and there are N sets of data. During the operation, arithmetic mean or weighted mean processing is performed on the sub-data at the same position of the N sets of data, until each sub-data in one set of data and the sub-data at the corresponding position in the other N−1 sets of data are processed by arithmetically mean or weighted mean, and finally the sub-data is synthesized as one data set to be output.

As a technical solution, a cumulative mean algorithm is used in the multi-frame mean of filtering process. An initial value is set. A previous output value is multiplied by n−1, followed by adding a currently received value, and then a result of the adding is divided by n to obtain a result as a current output, wherein the value of n represents a mean number of times. Similarly, each set of data received here can also include M sub-data. During the operation, each sub-data in a single data set is multiplied by n−1, followed by adding one sub-data at the corresponding position in the received data at a current time, and then a result of the adding is divided by n to obtain a result as the current output, and the current output also includes a set of data with M sub-data. Since a sliding mean filtering algorithm requires a large amount of data to be stored in a memory, it is suggested to adopt a cumulative mean calculation method when the storage resource is tight.

In summary, according to the present disclosure, the frame signals of the base station are repeatedly sent according to the frame period of the base station, therefor, the frame signals of the base station are received in time division, and the frame reference signal of the base station is selected by multi-frame mean, and the frame reference signal is used to shield the base station. The method provided by the present disclosure can effectively resist noise interference, non-synchronized scanning interference, and interference on an uplink signal of a TDD system, etc; and the method has strong interference resistivity, which is equivalent to increasing the coexistence capability with the shielding devices (such as scanning type and white noise type shielding devices) in other modes. In addition, the present disclosure reduces the power of useless user data compared with normal storage and forwarding, and the present disclosure has higher performance.

DETAILED DESCRIPTION OF THE EMBODIMENTS

The present disclosure will be further described in detail below with reference to the drawings and specific embodiments, and the present disclosure is related to a shielding device in the store-forward mode (the Patent No. CN103607254B).

The First Embodiment

Figure 1:
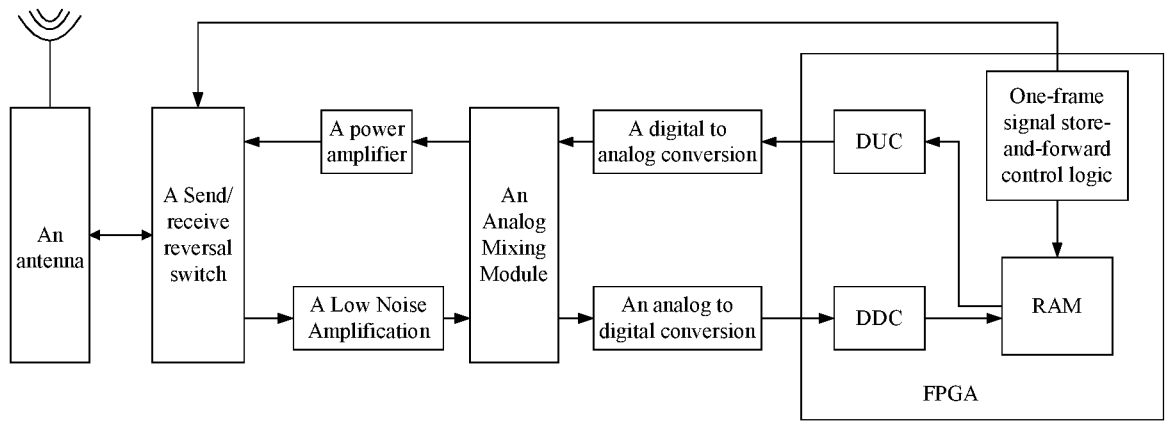
FIG. 1 is a schematic diagram of storage and forwarding of a prior system disclosed in the Patent No. CN103607254B.
Figure 2:
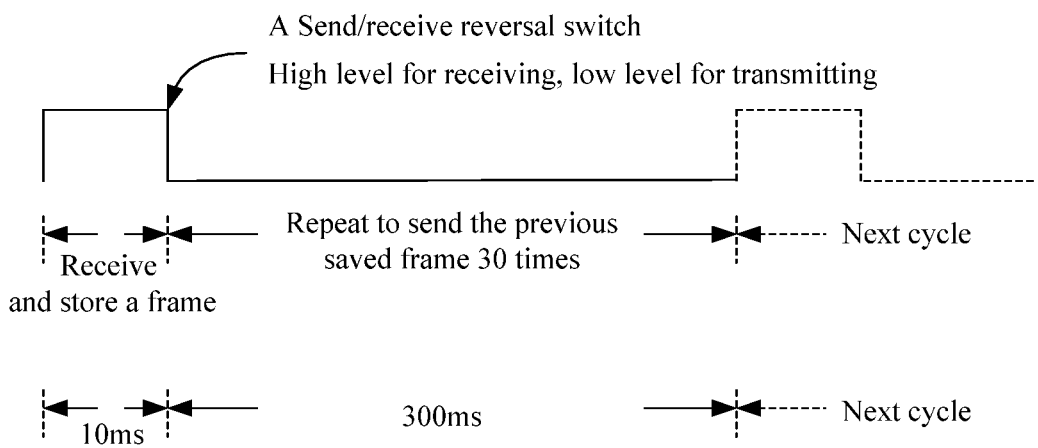
FIG. 2 is a schematic diagram showing storing data of a frame and then repeatedly sending the data, as disclosed in the Patent No. CN103607254B.
Figure 3:
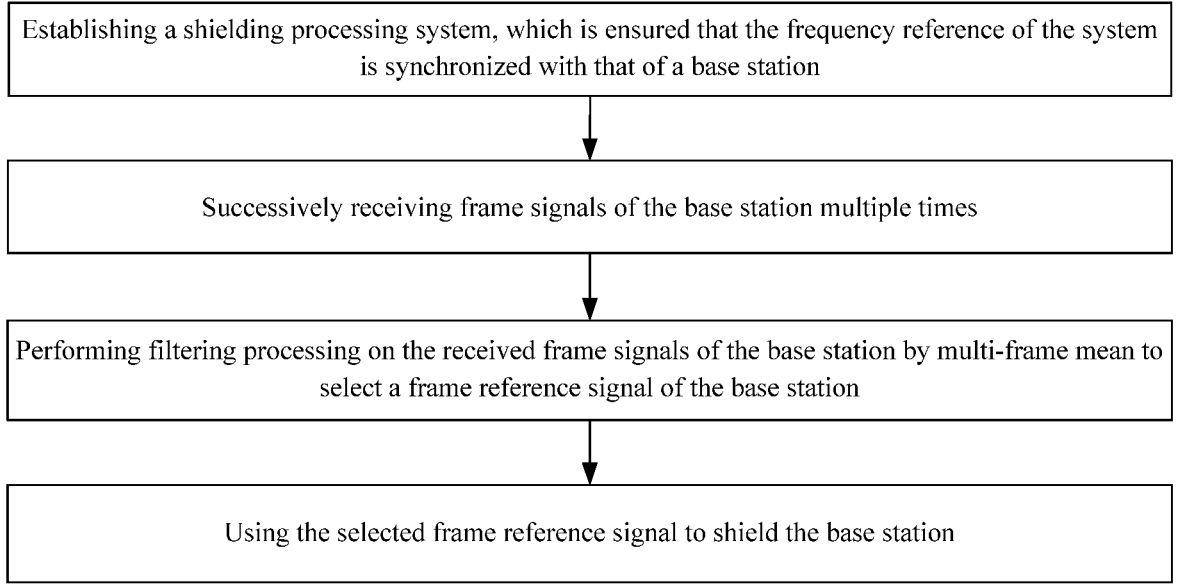
FIG. 3 is a flowchart diagram of a method for shielding a base station by using a frame reference signal of the base station according to a first embodiment of the present disclosure.

The embodiment is a signaling-type management and control method for mobile phone signals, and the method may include the following steps, referring to FIG. 3: establishing a shielding processing system, wherein a frequency reference of the system is synchronized with that of a base station, receiving frame signals of the base station in time division, filtering the frame signals of the base station by multi-frame mean to select a frame reference signal of the base station, and shielding a transmitting signal of the base station by the selected frame reference signal to achieve management and control for the mobile phone signals.

According to the present disclosure, the frame signals of the base station are repeatedly sent according to the RF frame period of the base station, therefore, the frame signals of the base station are received in time division, and the frame signals of the base station are filtered by multi-frame mean. Since user data is changing over time, i.e., the signal of data has time-varying characteristics, most of the modulated signals of the user data contained in the frame signals are removed by filtering with vector sum due to the time-varying characteristics, i.e., the modulated signals of the user data, which consume most of the RF transmitting power, are removed from the frame signals, while the reference signal from the base station to the mobile phone is enhanced because it is always present and in constant phase. Then the filtered frame reference signal of the base station is transmitted synchronously to disrupt the base station signals. Because the transmitted frame reference signal of the base station and the original downlink frame reference signal of the base station have the same properties, either of them is the downlink frame reference signal of the base station for the mobile phone. However, the mobile phone cannot distinguish whether the signal is transmitted by the base station or by the shielding device, and when the disruption is large enough, it may cause failure of decoding and disconnection of the mobile phones with network. Based on the method of the present disclosure, during transmission the RF power consumed by the modulation signal portion of the user data, which accounts for a large percentage of the frame signals of present base stations, can be effectively avoided, thereby effectively improving the shielding efficiency of the shielding device. The technology is effective for various mobile communications, so it has good universality. The above-mentioned shielding processing system is a conventional system, and the specific structure of the system will not be described in detail.

The Second Embodiment

Figure 4:
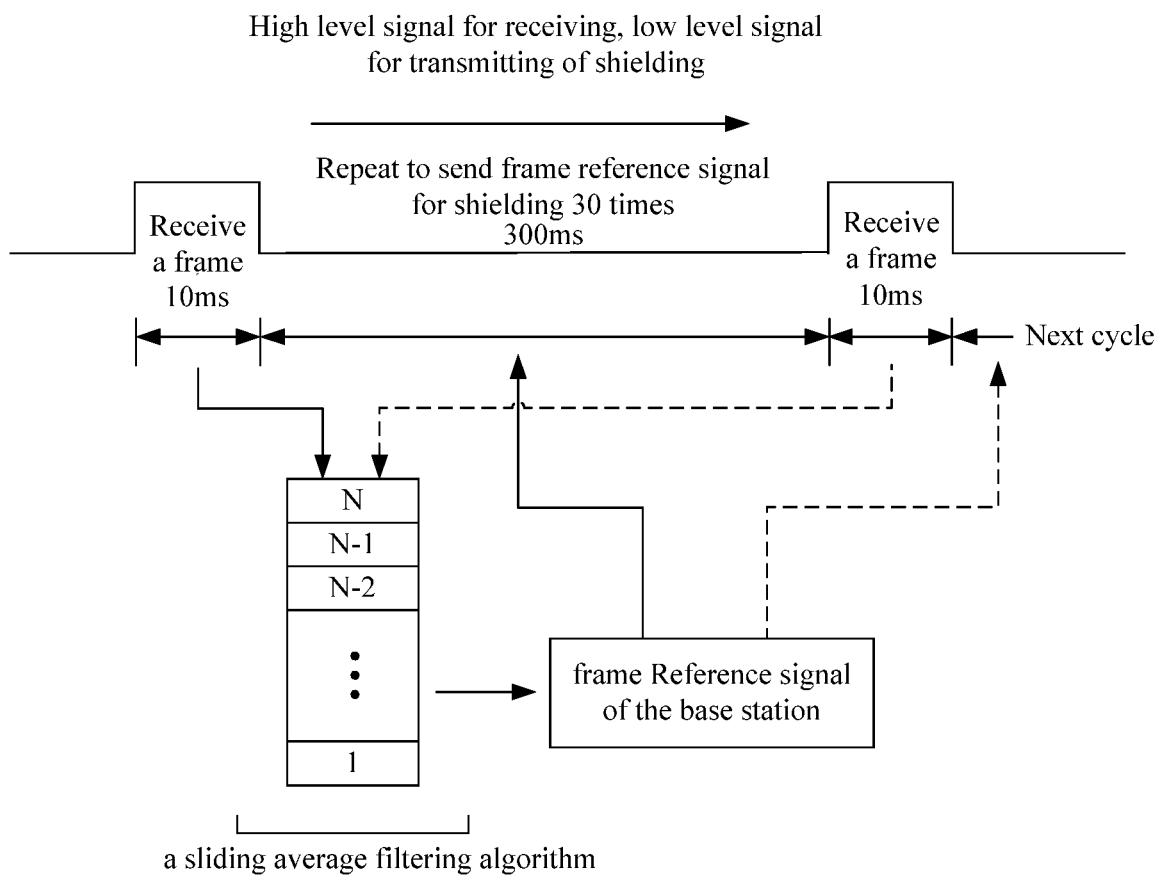
FIG. 4 is a schematic diagram of a sliding mean filtering method according to a second embodiment of the present disclosure.

As shown in FIG. 4, a sliding mean filtering algorithm is used in the multi-frame mean of filtering process in the embodiment. Specifically, a data buffer is created first, and N sets of sample data are stored in order in the data buffer, then the earliest set of data is discarded when each new set of data is collected, and then an arithmetic mean or a weighted mean of the N sets of data including the new sets of data is calculated. For the case of a sliding mean filtering algorithm as a multi-frame mean filtering process, an arithmetic mean value or a weighted mean value of N sets of data including the new sets of data is calculated as a set of data for shielding transmission. In the figure, a dotted line is denoted by a flow direction of a next signal.

Figure 5:
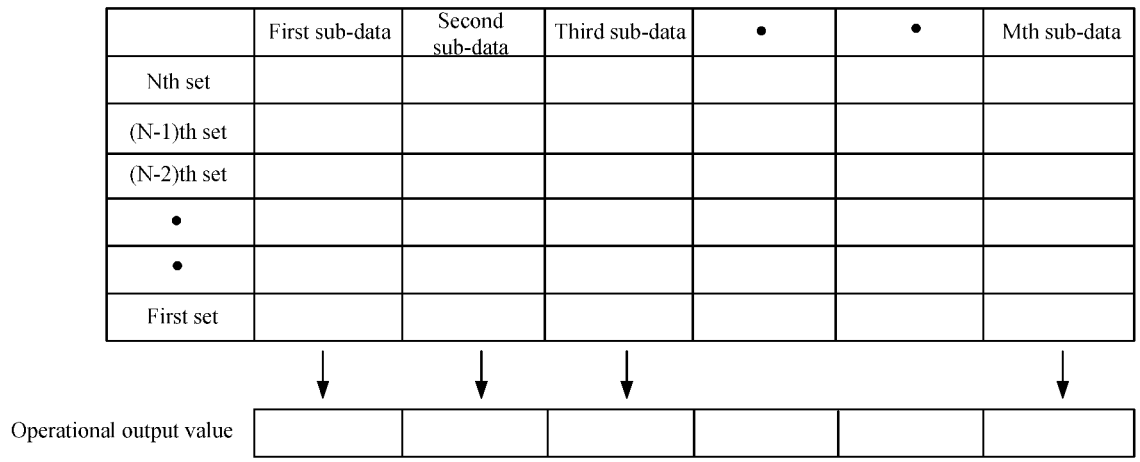
FIG. 5 is a schematic diagram of an algorithm of a sliding mean filtering method.

As shown in FIG. 5, in this embodiment, each set of data is composed of M sub-data, and there are N sets of data. During the operation, arithmetic mean or weighted mean processing is performed on the sub-data at the same position of the N sets of data, until each sub-data in one set of data and the sub-data at the corresponding position in the other N−1 sets of data are processed by arithmetically mean or weighted mean, and finally the sub-data is synthesized as one data set to be output.

The Third Embodiment

Figure 6:
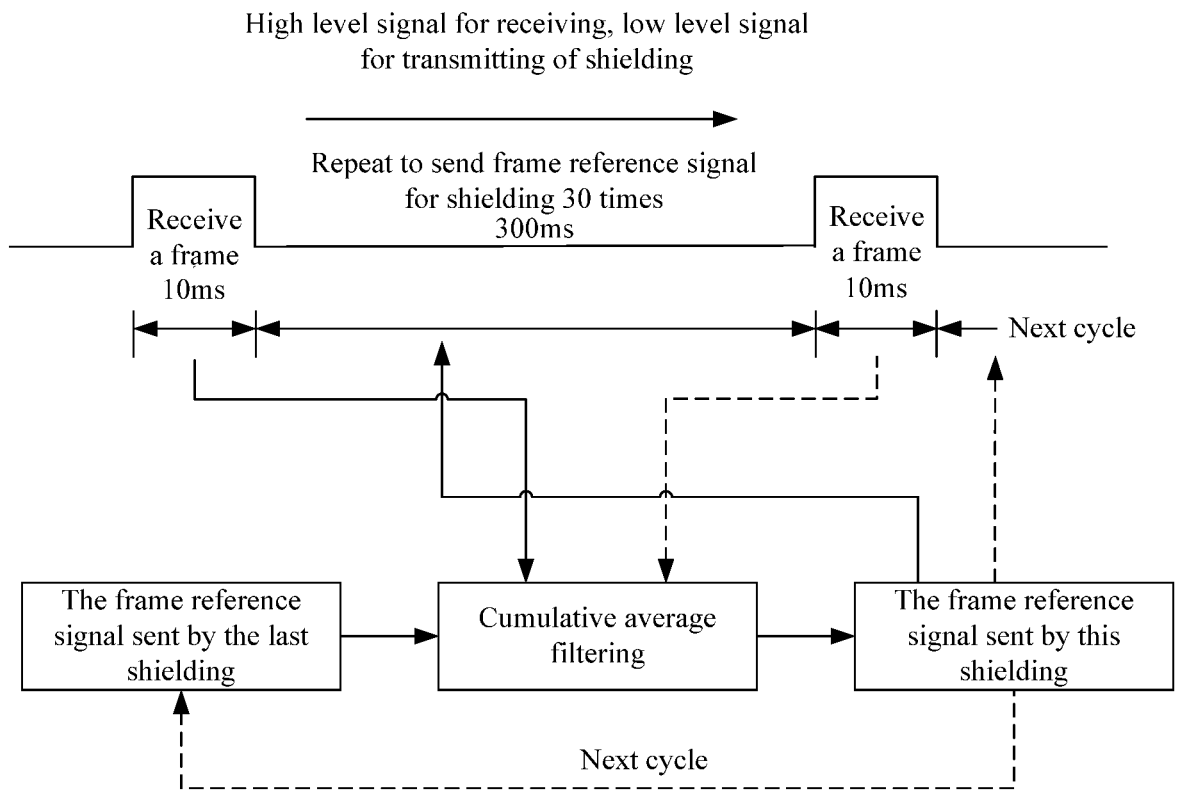
FIG. 6 is a schematic diagram of a cumulative mean filtering method according to a third embodiment of the present disclosure.

As shown in FIG. 6, a cumulative mean algorithm is used in the multi-frame mean of filtering process in the embodiment. An initial value is set as zero. A previous output value (namely, the set of data obtained by a previous operation, each data of which needs to be obtained) is multiplied by N−1, followed by adding a currently received value (the data in the corresponding set of data), and then a result of the adding is divided by N to obtain a result as a current output, wherein the value of N represents a mean number of times. Since a sliding mean filtering algorithm requires a large amount of data to be stored in a memory, it is suggested to adopt a cumulative mean calculation method when the storage resource is tight.

Similarly, each set of data received here can also include M sub-data. During the operation, each sub-data in a single data set is multiplied by n−1, followed by adding one sub-data at the corresponding position in the received data at a current time, and then a result of the adding is divided by n to obtain a result as the current output, and the current output also includes a set of data with M sub-data.

It is understood that to a person skilled in the art, equivalent substitutions or changes to the technical solutions and inventive ideas of the present disclosure shall fall within the scope of protection of the claims appended to the present disclosure.

We claim:

1. A signaling-type management and control method for mobile phone signals, the method comprising:
   establishing a shielding processing system, wherein a frequency reference of the shielding processing system is synchronized with that of a base station;
   receiving frame signals of the base station in time division;
   filtering the frame signals of the base station by multi-frame mean to select a frame reference signal of the base station; and
   shielding a transmitting signal of the base station by the selected frame reference signal to achieve management and control for the mobile phone signals;
   wherein the filtering the frame signals of the base station by multi-frame mean is implemented by a cumulative mean algorithm, which comprises:
   setting an initial value; multiplying a previous output value by n−1, followed by adding a currently received value; and then dividing a result of the adding by n to obtain a result as a current output, wherein the value of n represents a mean number of times.

\* \* \* \* \*